United States Patent [19]

Mastrippolito et al.

[11] Patent Number: 4,973,845

[45] Date of Patent: Nov. 27, 1990

[54] VERY HIGH RESOLUTION AUTOFLUOROSCOPE FOR IONIZING RADIATION

[75] Inventors: Roland Mastrippolito, Plaisir; Hervé Tricoire, Palaiseau; Luc Valentin, Bures sur Yvette; Christophe Raymond, Paris; Michel LeBlanc, Antony, all of France

[73] Assignee: Centre National de la Recherche Scientifique (CNRS), Paris, France

[21] Appl. No.: 289,012

[22] Filed: Dec. 22, 1988

[30] Foreign Application Priority Data

Dec. 24, 1987 [FR] France ................ 87 18179

[51] Int. Cl.$^5$ .............................................. G01T 1/20
[52] U.S. Cl. ................................. 250/368; 250/366; 250/367
[58] Field of Search ............... 250/366, 367, 368, 369, 250/328

[56] References Cited

U.S. PATENT DOCUMENTS

| | | | |
|---|---|---|---|
| 3,308,438 | 3/1967 | Spergel | 250/366 |
| 4,284,890 | 8/1981 | Thompson | 250/366 |
| 4,298,796 | 11/1981 | Warner et al. | 250/367 |
| 4,437,007 | 3/1984 | Koslow et al. | 250/367 |
| 4,598,202 | 7/1986 | Koechner | 250/368 |
| 4,788,436 | 11/1988 | Koechner | 250/368 |

FOREIGN PATENT DOCUMENTS 2582100 5/1986 France.
60-159675 8/1985 Japan.
1150919 5/1969 United Kingdom.

OTHER PUBLICATIONS

Raymond, C., "Radio-Imageurs a Fibers Optiques Plastiques Scintillantes", Jun. 26, 1987, Orsau Centre of Paris—South University, pp. 1–109.

*Primary Examiner*—Constantine Hannaher
*Assistant Examiner*—Edward J. Glick
*Attorney, Agent, or Firm*—Blakely, Sokoloff, Taylor & Zafman

[57] ABSTRACT

A very high resolution radiochromatogram for ionizing radiation comprises at least one array made up of a set of filament-like members adapted to enable spatial marking of a surface to be analyzed according to a specific frame of reference and adapted to detect said radiation by scintillation and to transmit light produced by such detection. The array is formed by two groups of optical fibers. Each fiber is disposed along a respective straight line segment defining two orthogonal directions delimiting an analysis plane or surface. At least one of the groups is subdivided into two elementary groups spaced in a direction perpendicular to the analysis plane or surface. The fibers of the elementary groups are parallel.

15 Claims, 6 Drawing Sheets

VERY HIGH RESOLUTION AUTOFLUOROSCOPE FOR IONIZING RADIATION

The present invention was made at the Nuclear Physics Institute, Paris XI University (laboratory associated with IN2 P3 No 24024) and at the Nuclear Physics laboratory of Paris VII University.

It concerns a very high a very high resolution autofluoroscope for ionizing radiation featuring high speed counting.

BACKGROUND OF THE INVENTION

The use of radioactively marked isotopes in biology laboratories has expanded to a very great degree in recent times, primarily because of the growth of molecular biology and its increasing industrial applications.

A typical experiment in molecular biology consists in causing nucleic acids (DNA-RNA) to migrate on a gel by means of electrophoresis and to combine them with radioactively marked fragments of specific nucleic acids to form hybrids. During the electrophoresis the molecules migrate at a rate that is inversely proportional to their mass. The location on the gel of the radioactive fragments combined with the nucleic acids that have undergone electrophoresis makes it possible to identify the mass of the latter, which identification provides the biologist with a considerable amount of information.

The problem of identifying the position of radioactive isotopes is also encountered in biology, especially in the following operations:

analysis of "blots" or DNA sequences distributed in spots or specific areas over the gel, where the requirement is to analyze the spatial position of the blots, DNA sequencing, analysis of recombinatory phage ranges, one-dimensional and two-dimensional electrophoresis of proteins.

The biological products used in these techniques are usually marked with radioactive isotopes ($^{32}P$, $^{35}S$, $^3H$) which sporadically emit an electron having a continuous energy spectrum with a maximum in the vicinity of Eo/2 where Eo is the maximal energy of the electron (Eo=1.7 Mev, 167 Kev, 18 Kev for $^{32}P$, $^{35}S$, $^3H$, respectively).

Given the importance of these techniques in modern biology, it is essential to optimize the spatial detection of the radiation emitters. This is made all the more difficult by the fact that the spatial resolution required for such detection (less than 1 mm) has to be achieved for at least one dimension over large surfaces (in the order of 30 cm×20 cm), as the experimental results for DNA sequencing by electrophoresis are in the form of strips distributed over surface areas of this magnitude; each strip identifies the presence of a specific nucleotide and has to be discriminated spatially from the next strip, in particular with regard to its transverse dimension.

At present detection relies on autoradiographic film. Although this method offers good spatial resolution, dependent almost exclusively on the grain size of the photographic emulsion used, it has a number of disadvantages including low sensitivity, the fact that it is difficult to measure radiation intensity because of saturation phenomena and the need for subsequent analysis by visual observation, of necessity entailing a subjective interpretation.

To remedy some of the aforementioned disadvantages work has been done on designing high resolution autofluoroscope type instruments. Instruments of this kind have been described, for example, in the journal "Nuclear Instruments & Methods in Physics Research" Vol. 216, 1983 - Nov. No. 3 Amsterdam, Netherlands, in an article entitled "Scintillator - Fiber charged - particle track - imaging detector" by W. R. Binns, M. H. Israel and J. Klarmann.

Although they make it possible to achieve an acceptable degree of resolution by virtue of their use of an array of scintillation optical fibers, devices of this kind cannot achieve counting rates better than ten impacts per second because their signal processing system uses a CID type image intensifying system comparable to the charge transfer device in a video camera.

SUMMARY OF THE INVENTION

An object of the present invention is to remedy the aforementioned disadvantages by providing a very high resolution chromatogram enabling very high counting rates to be achieved.

Another object of the present invention is a very high resolution autofluoroscope in which the electronic circuits for processing pulses generated by detection of a particle impact are of simple and inexpensive design and manufacture.

Another object of the present invention is a very high resolution and very high counting rate autofluoroscope in which background noise is significantly reduced and which makes it possible to achieve a resolution of 0.3 mm or better in at least one analysis direction.

The very high resolution autofluoroscope for ionizing radiation in accordance with the invention comprises at least one array R made up of a set of filament-like members of rank i adapted to enable spatial marking of a surface to be analyzed according to a specific frame of reference and adapted to detect said radiation by scintillation and to transmit light produced by such detection. It is characterized in that said array R is formed by two groups N1 and N2 of optical fibers. Each fiber is disposed along a respective straight line segment defining two orthogonal directions d1, d2 delimiting an analysis plane or surface. At least one of the groups (N1) is subdivided into two elementary groups N11, N12 spaced in a direction perpendicular to the analysis plane or surface (by a distance HP). The fibers (fi11, fi12) of the elementary groups N11, N12 are parallel.

The invention finds applications in genetic engineering and biology (experiments in fundamental research), industry, observation and medical diagnosis.

BRIEF DESCRIPTION OF THE DRAWINGS

It will be better understood from the following description and from reference to the drawings in which.

DESCRIPTION OF THE PREFERRED EMBODIMENTS

The very high resolution autofluoroscope in accordance with the invention will first be described with reference to FIG. 1.

Referring to the aforementioned figure, the very high resolution autofluoroscope for ionizing radiation in accordance with the invention comprises at least one array R made up of a set of filament-like members of rank i adapted to enable spatial marking of a surface to be analyzed relative to a specific frame of reference. The array of filament-like members is also adapted to detect radiation by scintillation and to transmit the light produced by such detection. As shown in FIG. 1 the array R has a substantially plane shape corresponding to the surface to be analyzed, the electrophoresis gel undergoing analysis being disposed in proximity with the aforementioned array R.

According to one particularly advantageous aspect of the autofluoroscope in accordance with the invention the array R is formed of two groups N1 and N2 of optical fibers. Each component fiber of a group N1 or N2 is disposed along a respective straight line segment defining two orthogonal directions denoted d1 and d2 in FIG. 1. The directions d1, d2 therefore delimit the aforementioned analysis plane or surface.

Figure 1:
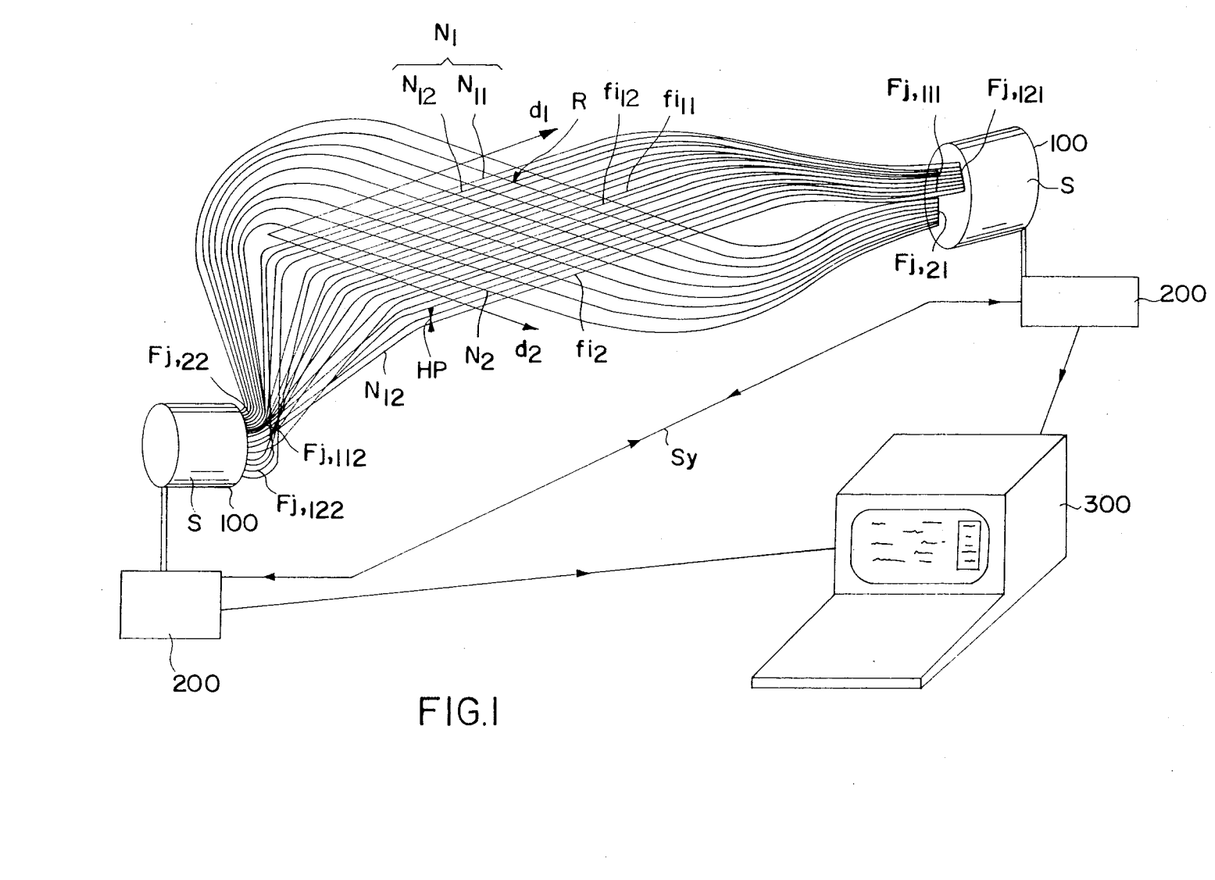
FIG. 1 shows a general schematic view of the autofluoroscope in accordance with the invention.

As shown in FIG. 1 by way of non-limiting example only at least one of the groups (the group N1) is subdivided into two elementary groups N11 and N12. The elementary groups N11 and N12 are spaced in a direction perpendicular to the analysis plane or surface by a distance HP. The optical fibers constituting the first elementary group N11 are denoted fi11 and the optical fibers constituting the second elementary group N12 are denoted fi12. The optical fibers constituting the second group N2 are denoted fi2. The optical fibers fi11 and fi12 respectively constituting the first and second elementary groups N11 and N12 are parallel and oriented in the direction d1.

Providing a second elementary group N12, for example, with its component fibers fi12 oriented in the direction d1, makes it possible to improve the resolution in the direction d2 perpendicular to the direction d1, as will be described in more detail hereinafter in relation to FIG. 2a.

Figure 2A:
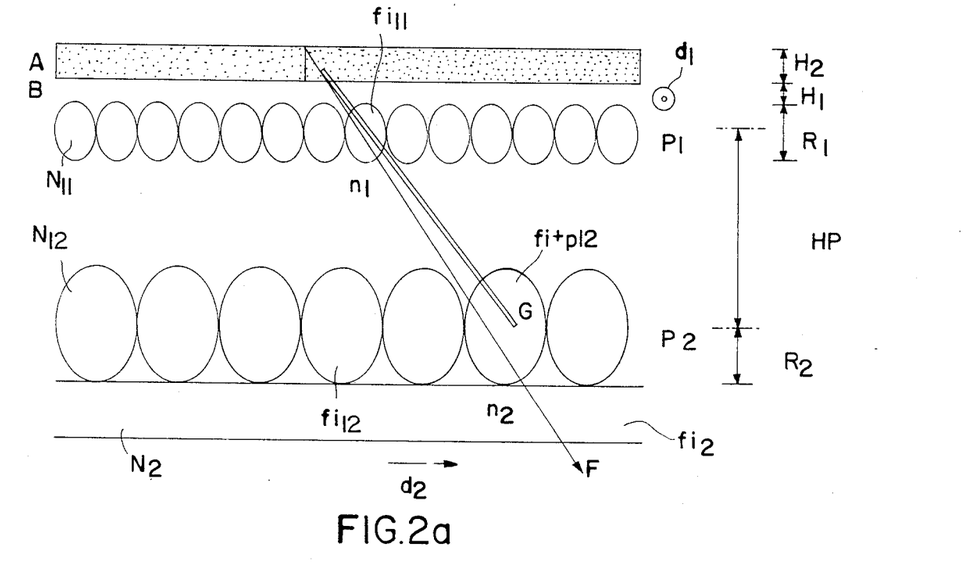
FIG. 2a shows in detail a non-limiting advantageous embodiment of the array R of optical fibers of the autofluoroscope in accordance with the invention.

In FIG. 2a there is shown in cross-section a specific configuration of the array R, the various elements of which will be defined hereinafter.

The electrophoresis gel (or filter) A undergoing analysis on the analysis plane constituted by the array R has a thickness H2 and contains radioactive emitters which have to be located. Between the aforementioned electrophoresis gel or filter A of thickness H2 and the array R is an interleaved film B isolating the fibers fi11 constituting the first group N11, which are oriented in the direction d1. The aforementioned interleaved sheet B has a thickness H1. The interleaved film may be a film of plastics material having a thickness of a few tenths of a millimeter. The optical fibers fi11 constituting the first elementary group N11 have a radius R1 and the second elementary group N12 is made up of optical fibers fi12 which are aligned in the same direction d1. The elementary groups N11 and N12 are separated by a distance HP and the optical fibers fi12 constituting the second elementary group N12 have a radius R2. Planes P1 and P2 contain the optical fibers fi11 and fi12 of groups N11 and N12 respectively as shown in FIG. 2a.

Figure 2B:
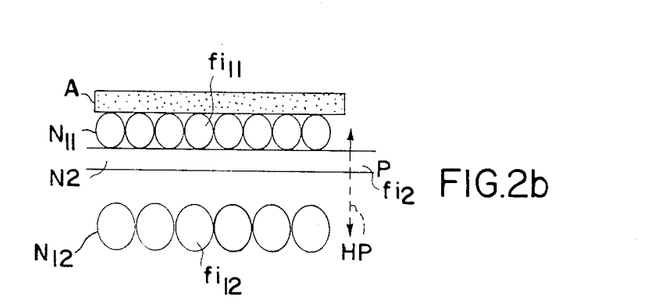
FIG. 2b shows a non-limiting alternative embodiment of the array R shown in FIG. 2a, FIG. 2c shows another embodiment of the array R of optical fibers in the case where both groups N1 and N2 of optical fibers are subdivided into elementary groups.

The second group N2 is made up of optical fibers fi2 oriented towards the direction d2. The second group N2 is preferably adjacent the second elementary group N12. Plane p contains the fibers Fi2 of group 2 of group N2 as shown in FIG. 2b. The trajectory of an electron emitted by a radioactive element situated in the electrophoresis gel A is shown at F. The computed trajectory of an electron is shown at G and corresponds to the trajectory joining the optical centers or central axes of the fibers n1 and n2 on which the electron emitted by the radioelement contained in the previously mentioned electrophoresis gel has impacted.

Light is emitted by scintillation in each of the optical fibers because of the impact of the electron. Detecting this light makes it possible to identify the rank of the fibers affected in each elementary group, as will be explained in detail later in this description.

The rank of the fibers n1 and n2 corresponding, for example, to the fibers fi11 and fi+p12 of the elementary groups N11 and N12 having been determined, it is then possible to determine a computed position of the radioactive emitter by means of the equations:

$$D1 = 2 \times n1 \times R1 - R1 \quad (1)$$
$$D2 = 2 \times n2 \times R2 - R2 \quad (2)$$
$$D = D1 + (D1 - D2) \times (H1 + R1 + H2/2)/HP \quad (3)$$

In the foregoing equations n1 and n2 represent the rank i of the optical fibers of the group N11, N12, R1 and R2 the radii of the fibers, H2 the thickness of the gel A, D1, D2 the position of the fibers fi11, fi2 affected in terms of distance relative to the origin of the fibers and D the computed position.

It may be noted from the aforementioned equations that the difference in position computed for two consecutive fibers of the elementary group N12 on which an electron has impacted is inversely proportional to the distance HP between the elementary groups N11 and N12. The separation power of the device therefore increases in proportion to the distance HP, which makes it possible to obtain a very high resolution autofluoroscope.

Various embodiments of the array R will now be described with reference to FIGS. 2b and 2c.

Although in FIG. 2a the optical fibers fi11 and fi12 constituting the elementary groups N11 and N12 are situated on the same side of the group N2 constituted by the optical fibers fi2, the optical fibers fi11 and fi12 respectively constituting the elementary groups N11 and N12 may be situated as shown in FIG. 2b. In this case the optical fibers fi11 and fi12 constituting the elementary groups N11 and N12 are interleaved with the optical fibers fi2 of the group N2.

The fibers fi2 constituting the second group N2 are preferably (but not necessarily) disposed in the gap HP between the two elementary groups N11 and N12, in the proximity of the first elementary group N11, for example.

Figure 2C:
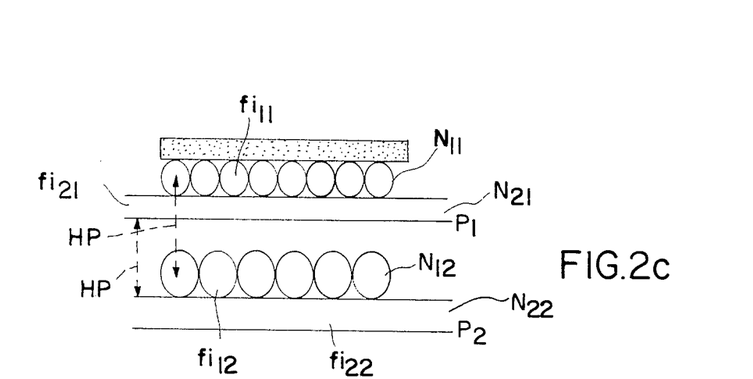

If both groups N1 and N2 are subdivided into respective elementary groups N11, N12 and N21, N22 the various aforementioned elementary groups are interleaved as shown in FIG. 2c. By way of non-limiting example, the optical fibers fi21 constituting the first elementary group N21 are situated in the gap HP between the two elementary groups N11 and N12 and the optical fibers fi12 constituting the second elementary group N12 are situated in the gap HP between the two elementary groups N21 and N22 constituted by the fibers fi21 and fi22. Planes P1 and P2 contain the optical fibers fi21 and fi22 of groups N21 and N22 respectively as shown in FIG. 2c.

The optical fibers fi11, fi12 and fi21, fi22 may be plastics material optical fibers, scintillating optical fibers, of the same diameter, for example. Alternatively, the optical fibers fi11 and fi12 may have different diameters than the fibers fi21 and fi22. In one particularly advantageous embodiment the ratio between the diameters of the aforementioned optical fibers (the ratio R1/R2) is equal to ½.

Tests and simulations have been carried out with an autofluoroscope in accordance with the invention comprising an array of optical fibers as previously described on the basis of a program derived from the program described in the university thesis by C. RAYMOND entitled "Radio-imageurs à fibres optiques plastiques scintillantes" ("Scintillating plastic optical fiber radio-imagers") submitted to the Orsay Centre of Paris-South University on 26 June 1987. The program used is a Monte Carlo type simulation in which all the physical elements of the detector are parametered: position of the emitter, random trajectory of the electron, intersection with the scintillating optical fibers, creation of photons in the fibers, conduction to the ends, effectiveness of the detector photocathodes, optical crosstalk, electronic threshold. Given the existence of first and second elementary groups N11 and N12, the position XC obtained after simultaneous detection by means of the preceding algorithm was compared with the actual position XR of the radioactive emitter. The histogram of the distribution for the values XC-XR then indicates the separation power PS of the device given by the total width of the histogram at half the height.

Figure 3A:
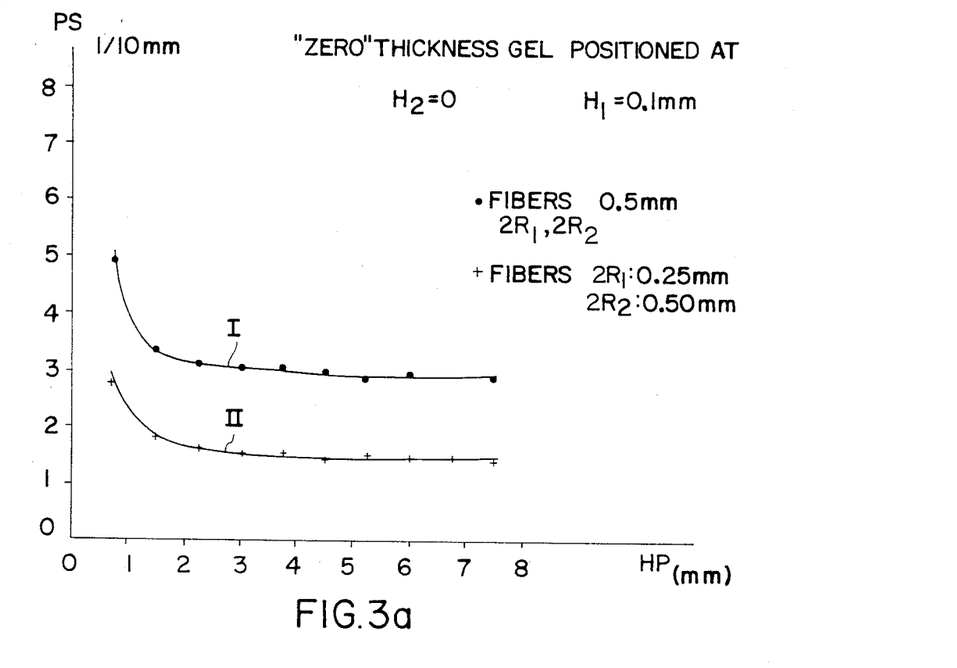
FIG. 3a shows a curve giving the separation power of the autofluoroscope in accordance with the invention as a function of the distance (HP) separating the elementary groups in the case where an electrophoretic gel to be analyzed of "zero" thickness is used.

FIG. 3a shows values of the separation power PS as a function of the distance HP and two elementary groups N11, N12 for several configurations. The case of FIG. 3a corresponds to an electrophoresis gel the thickness H2 of which is substantially zero. On the other hand, the case of FIG. 3b corresponds to an electrophoresis gel of thickness H2 equal to 0.3 mm. In both cases the position of the electrophoresis gel relative to the analysis plane corresponds to a distance H1=0.1 mm. In each of FIGS. 3a and 3b the abscissae give the value of the distance HP in millimeters and the ordinates give the aforementioned difference XC-XR representative of the separation power of the autofluoroscope in accordance with the invention in the direction d2. The values of XC-XR plotted on the ordinates axis are expressed in tenths of a millimeter. In both cases FIGS. 3a and 3b show in succession the aforementioned variation of the difference XC-XR, on the one hand for fibers fi11 and fi12 with the same diameter (5 mm) in the case of curve I and on the other hand for fibers fi11, fi12 of different diameter, the fibers fi11 having a diameter of 0.25 mm, for example, and the fibers fi12 having a diameter of 0.50 mm, in the case of curve II.

Figure 3B:
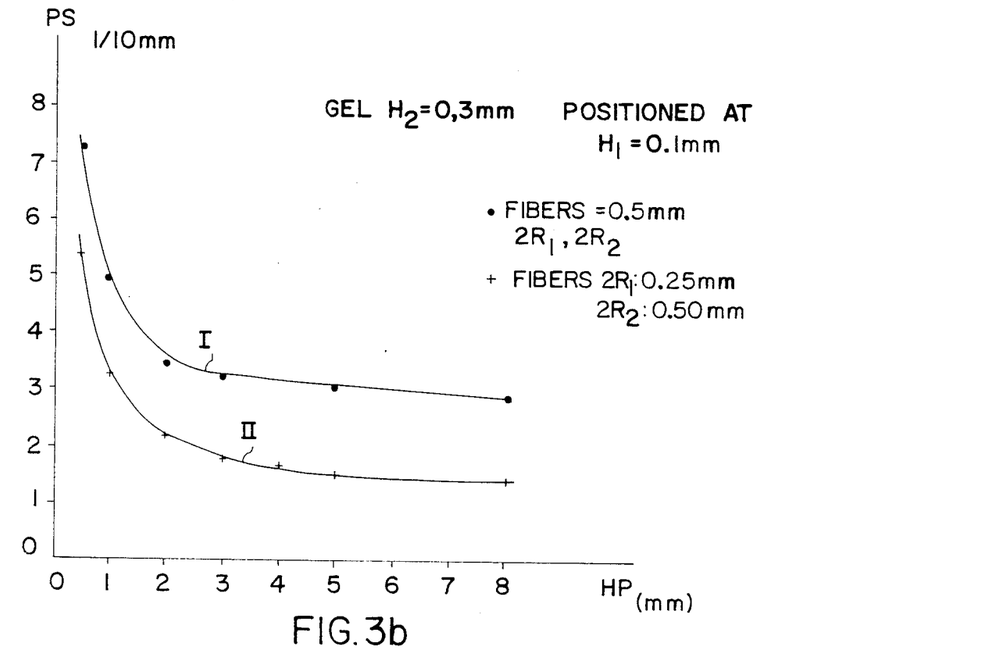
FIG. 3b shows a curve giving the separation power of the autofluoroscope in accordance with the invention as a function of the distance (HP) separating the elementary groups in the case where an electrophoretic gel to be analyzed of thickness 0.3 mm is used.

Taking FIGS. 3a and 3b as a whole, the following important results will be noted:

the separation power of the autofluoroscope in accordance with the invention in the direction perpendicular to the direction of alignment of the fibers of the corresponding group or elementary group improves as the distance HP between elementary groups increases, as shown in FIGS. 3a and 3b;

however, after a sudden drop in the difference XC-XR and an inverse variation in the separation power, the latter tends to level out for values of the distance HP greater than approximately 3 mm with the analyzed configuration;

the separation power obtained with a distance HP greater than approximately 3 mm is significantly greater than that achieved with devices of the prior art having only one plane or only one group and in configurations as shown in FIGS. 3a and 3b a separation power in the order of 150 µm can be achieved in the direction d2;

there is no significant deterioration of the separation power if thick emitters (meaning emitters contained in a thick electrophoresis gel) are analyzed, which is contrary to what can be observed with the use of autofluoroscopes incorporating only a group not subdivided into elementary groups; this latter point is particularly important for the direct analysis of sequence gels.

The autofluoroscope in accordance with the invention opens up a much wider field of applications than the prior art autofluoroscope devices because of the configuration of the array of optical fibers as shown in FIGS. 2a, 2b, 2c. In particular, with an array R configured as shown in FIG. 2c the separation power in the directions d1 and d2 may then be optimized in both the corresponding dimensions. However, in this latter case the effectiveness of the autofluoroscope device will be slightly reduced in the current state of scintillating optical fiber technology.

Figure 2D:
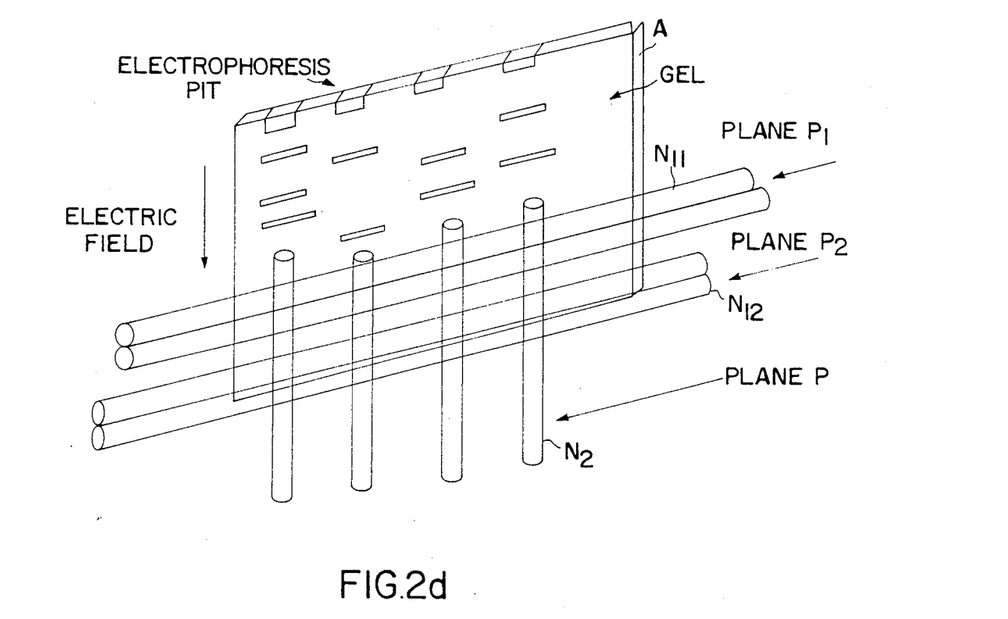
FIG. 2d shows one specific mode of use of an autofluoroscope in accordance with the invention for sequencing DNA molecules.

The separation power performance in the direction d2 or d1, for example, achieved in the case of the configuration shown in FIG. 2a or 2b make it possible to use the autofluoroscope in accordance with the invention for the on-line detection of radioelements migrating in sequence gels, according to the principle shown in FIG. 2d.

In this case the electrophoresis gel is brought virtually into contact with the analysis plane constituted by the first elementary group N12 at one of its ends, the electrophoresis gel being separated from the analysis plane only by the interleaved separator film denoted B in FIG. 2a, as previously mentioned. The radioelements migrate into the gel and pass in front of the array R of the autofluoroscope in accordance with the invention. The simultaneous recording of the detection time and the position of the emitted electrons gives the radioelement migration speed spectrum and this spectrum can be computer processed to deduce the corresponding DNA sequence. The radioelements are caused to migrate by the electric field applied to the electrophoresis gel in the conventional way.

The improved performance of the autofluoroscope in accordance with the invention is essentially due to the use of scintillating optical fiber groups subdivided into elementary groups separated by a predetermined distance. Also, and advantageously, where the optical fibers constituting the elementary groups have different diameters the optical fibers of smaller diameter are preferably used to constitute the elementary group (such as the group N11) intended to form the analysis surface.

A more detailed description of the elements enabling detection of the optical fibers affected by the impact of an electron emitted by the radioactive emitters will now be given with reference to FIGS. 1 and 4a, 4b, 4c.

As shown in FIG. 1 in particular, the optical fibers fi11, fi12, fi2, fi21, fi22 are grouped together at one end to form subsets denoted Fj, r where r represents the level of the group or elementary group of optical fibers constituting the array R.

By way of non-limiting convention the parameter r designating the level of the groups or elementary groups constituting the array R may take the values 111; 112, 121, 122; 21; 22; 211; 212; 221; 222.

By convention and to facilitate the notation the indices assigned to the references designating the optical fibers or the subsets must be read as follows: fi12:i designates the rank of the optical fiber constituting the elementary group or the corresponding group N11, N12 or N2, N21, N22, the first next index indicates the rank of the group of optical fibers N1 or N2 and the second next index indicates the rank of the elementary group or subgroup constituting the aforementioned group, elementary group denoted N11, N12 or N21, N22.

The index r taking the foregoing values, the hundreds digit designates the rank of the group, the tens digit designates the rank of the elementary group and the units digit designates the end of each optical fiber constituting the groups or elementary groups of optical fibers.

The subset Fj, r with r=111 therefore designates the subset of rank j constituted by an appropriate group of fibers of the first elementary group N11 at the so-called first end 1 of the optical fibers constituting the first elementary group N11. Likewise, the subset Fj, r with r=122, for example, designates the subset of rank j of the second elementary group N12 constituted at the second end of the fibers constituting this second elementary group.

The subsets Fj, r with r=111, 112, 121, 122 obtained in this way from the first elementary group N11 and the second elementary group N12, on the one hand, the subsets Fj, r with r=21, 22 obtained in this way from the second group N2 and the subsets Fj, r with r=211, 212, 221, 222 obtained from the first elementary group N21 and the second elementary group N22 constituting the second group N2 are coupled to detector means Sk, r. The detector means Sk, r could be discrete detectors, the index k corresponding to the index j of the previously defined subsets, a number of discrete detectors corresponding to the number of aforementioned subsets Fj being provided and the index r corresponding equally to the level of the elementary group or of the group constituting the array R. FIG. 1 shows in a purely schematic way the grouping of the ends of the optical fibers into subsets Fj, r in the case where the array R comprises a single group of doubled up optical fibers or elementary groups, the groups N11 and N12. In this figure the detectors Sk, r are symbolically represented as a single detector combining several elementary detectors. As also represented schematically in FIG. 1 the single detectors 100 are controlled by control circuits 200 in turn controlled by a microcomputer 300. The aforementioned detectors are synchronized via a connection denoted SY as will be explained in more detail subsequently in this description.

A more detailed description of one embodiment of an autofluoroscope in accordance with the invention as shown in FIG. 1 will now be given with reference to FIGS. 4a, 4b and 4c.

Figure 4A:
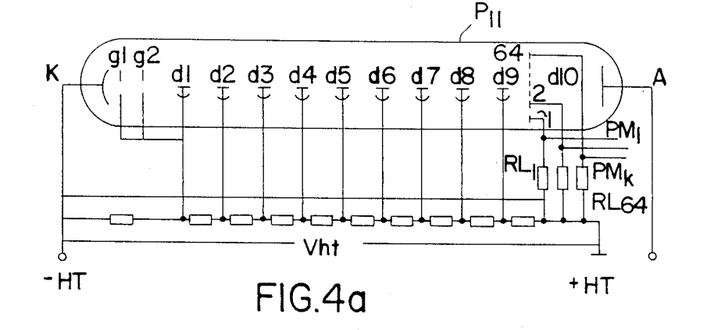
FIG. 4a shows a particularly advantageous embodiment of the detector means comprising a multidynode photomultiplier in each elementary group or component group of the array (R)
Figure 4B:
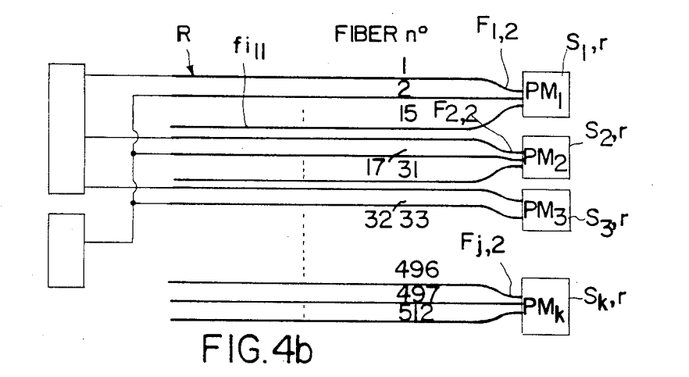
FIG. 4b shows a relative arrangement of the optical fibers constituting a group or elementary group of the array R.
Figure 4C:
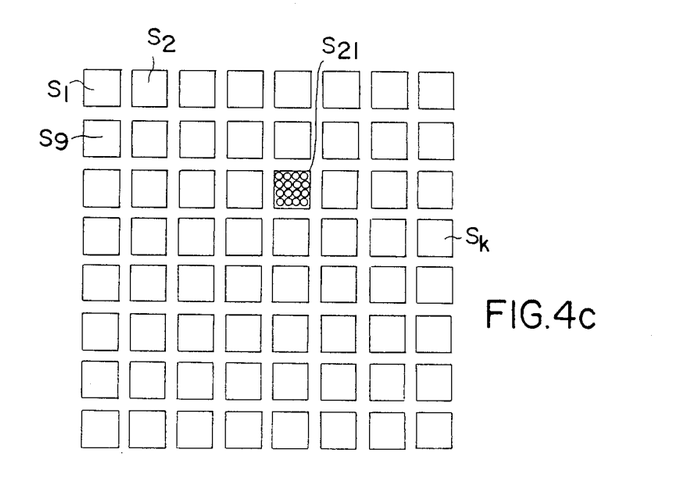
FIG. 4c shows the relative arrangement of the dynodes of a multidynode photomultiplier and of the ends of the optical fibers of the group or elementary group as shown in FIG. 4b.

The description of FIGS. 4a, 4b and 4c relates to a level r relative to a group or to an elementary group of optical fibers constituting the array R of the autofluoroscope in accordance with the invention.

In the aforementioned particularly advantageous embodiment and as shown in FIG. 4a the detector means Sk, r are provided in the form of respective first and second pluralities of detector means Sk, r, specifically discrete detectors.

In this embodiment the detector means may comprise two or more multidynode photomultiplier(s), the multidynode photomultipliers for each corresponding group or elementary group being denoted P11, P12, P21 or P22 according to whether or not the groups N1, N2 are subdivided into elementary groups N11, N12 or N21, N22. The detection means Sk, r may therefore advantageously comprise a multidynode photomultiplier. A multidynode photomultiplier of this kind is marketed by the company RTC (XP 4702 under the name multianode photomultiplier). A multiplier of this kind comprises a plurality of multidynode outputs plus a common anode output substantially corresponding to the sum of the outputs of the previous 64 dynodes. This latter output corresponds to the anode electrode which delivers an output signal substantially corresponding to the sum (logic OR) of the outputs of the previously mentioned 64 dynodes. FIG. 4a includes a schematic representation of a photomultiplier of this kind, the 64 dynode outputs being denoted S1, r through Sk, r in FIGS. 4b and 4c. In FIG. 4a the anode output is denoted A and the corresponding photocathode is denoted K.

The previously mentioned photomultiplier is in the form of a tube comprising 65 outputs; the first 64 outputs correspond to the 64 independent dynodes associated with 64 input pixels or coupling areas of a subset Fj, r of fibers fi11 or other fibers of the level r in question. The last output is the previously mentioned anode which substantially implements a logic OR function between all the signals delivered by the aforementioned 64 dynodes. Each dynode is 2 mm×2 mm with a pitch of substantially 2.54 mm.

FIG. 4c shows the corresponding arrangement of the aforementioned dynodes, a photocathode being associated with each of them. Using optical fibers fi11 or other fibers with a diameter less than 0.5 mm it is possible to group 16 fibers. By way of non-limiting example, there are associated with the photocathode S21, r the ends of 16 optical fibers fi11 1 through 16, the other end of these optical fibers being coupled, for example and as shown in FIG. 4b, to a respective one of the photocathodes S33r through S48r. A convenient distribution law for the ends of the optical fibers fi11 to constitute the subsets Fj2 for a set of 512 optical fibers could consist in grouping one end of the optical fibers into 32 groups of 16 fibers distributed over the photocathodes denoted S1, r through S32, r in FIG. 4c, the other end of the fibers fi11 being grouped in such a way that each fiber fi11 of rank i is coupled at its other end to the photocathode of rank S32+i, r, for example. Each fiber fi11 of rank i therefore accepts at most by way of a common subset two separate subsets of rank j and two different optical fibers of rank i and of the same level r, accepting at most by way of a common subset only one of the latter. It will be understood that each of the photocathodes Sk, r of the multidynode photomultiplier is coupled to a respective subset Fj of fiber ends.

For the purpose of detecting and counting impacts of ionizing particles the autofluoroscope in accordance with the invention may comprise means for detecting coincidence in the signal delivered by the detector means Sk, r and transcoding means whereby the rank i of the corresponding fiber fi may be established from coincident detection by two detector means Sk, r, Sk+p, r.

The rank i of the optical fiber affected by a scintillation detection (optical fiber of the given level r corresponding to a component fiber of a specific group or elementary group) is given by the logic equation:

$$i = (Fj, r, i) \cap (Fj+p, r, i) \quad (4)$$

In equation (4) the additional index i assigned to the subsets Fj, r of the given level r corresponds to the rank of the fiber of the subset where an impact has been detected, and F (j, r, i) and F (j+p, r, i) represent the subsets of rank j and j+p of the same group or elementary group of the same level r for which the logic signal delivered by the corresponding detector means Sk, r of the same level r and of rank k=j and k'=j+p has the value 1.

A more detailed description of the electronic circuits for detecting the rank of the optical fibers constituting each group or elementary group will be given with reference to FIGS. 5a and 5b.

Figure 5A:
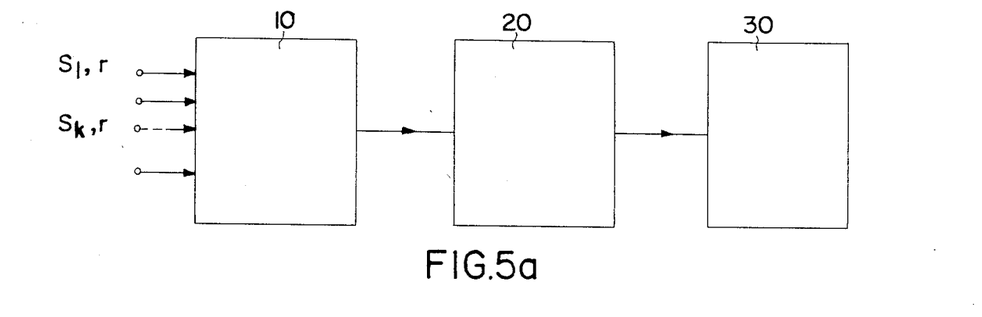
FIG. 5a shows a functional block diagram of the electronic processing circuits associated with each multidynode photomultiplier.

Generally speaking, the aforementioned electronic circuits comprise as shown in FIG. 5a in particular coincidence detection means operating on the signal delivered by the detector means Sk, r of the same level r and transcoding means for establishing from detection of coincidence at two detector means Sk, r, Sk+p, r of the same level r the rank i of the corresponding optical fiber element fi11, fi12, fi2, fi21, fi22 in conformity with the logic equation previously explained. The means for detecting coincidence in the signal delivered by the detector means Sk, r of the same level r correspond to the functional blocks 10 and 20 of FIG. 5a and the aforementioned transcoding matrix to the block 30, as will be explained later in the description.

Generally speaking, the coincidence detection means comprise amplifier means 10 coupled to each detector means Sk, r and delivering an amplified signal and threshold comparator means 20 receiving the amplified signal and delivering a logic signal in the presence of an amplified signal above the threshold value. Logic comparator means 30 for the logic signal delivered by the threshold comparator means are also provided.

As is further shown in FIG. 5a and for the purpose of detecting coincident pulse impacts the autofluoroscope in accordance with the invention may be arranged so that the coincidence detection means comprise amplifier means 10 coupled to each detection means Sk, r and delivering an amplified signal, threshold comparator means 20 receiving the amplified signal and delivering a logic signal in the presence of an amplified signal above the threshold value and logic comparator means 30 for the state of the logic signal delivered by the threshold comparator means 20. FIG. 5a shows the detection means Sk, r as comprising discrete photomultipliers. This embodiment is given by way of illustrative example only. It is to be understood that each discrete photomultiplier may advantageously be replaced by a multidynode photomultiplier as previously described.

A more detailed description of the threshold comparator means 20 will be given with reference to FIG. 5b.

This description corresponds to the embodiment of FIG. 2a in which the first group of optical fibers N1 is subdivided into elementary groups N11, N12 and there is no subdivision of the group N2. It is to be understood that in the case where the optical fiber group N2 is subdivided the circuits may be added to in such a way as to take into account the aforementioned subdivision, in a similar way to the subdivision of the group N1.

Figure 5B:
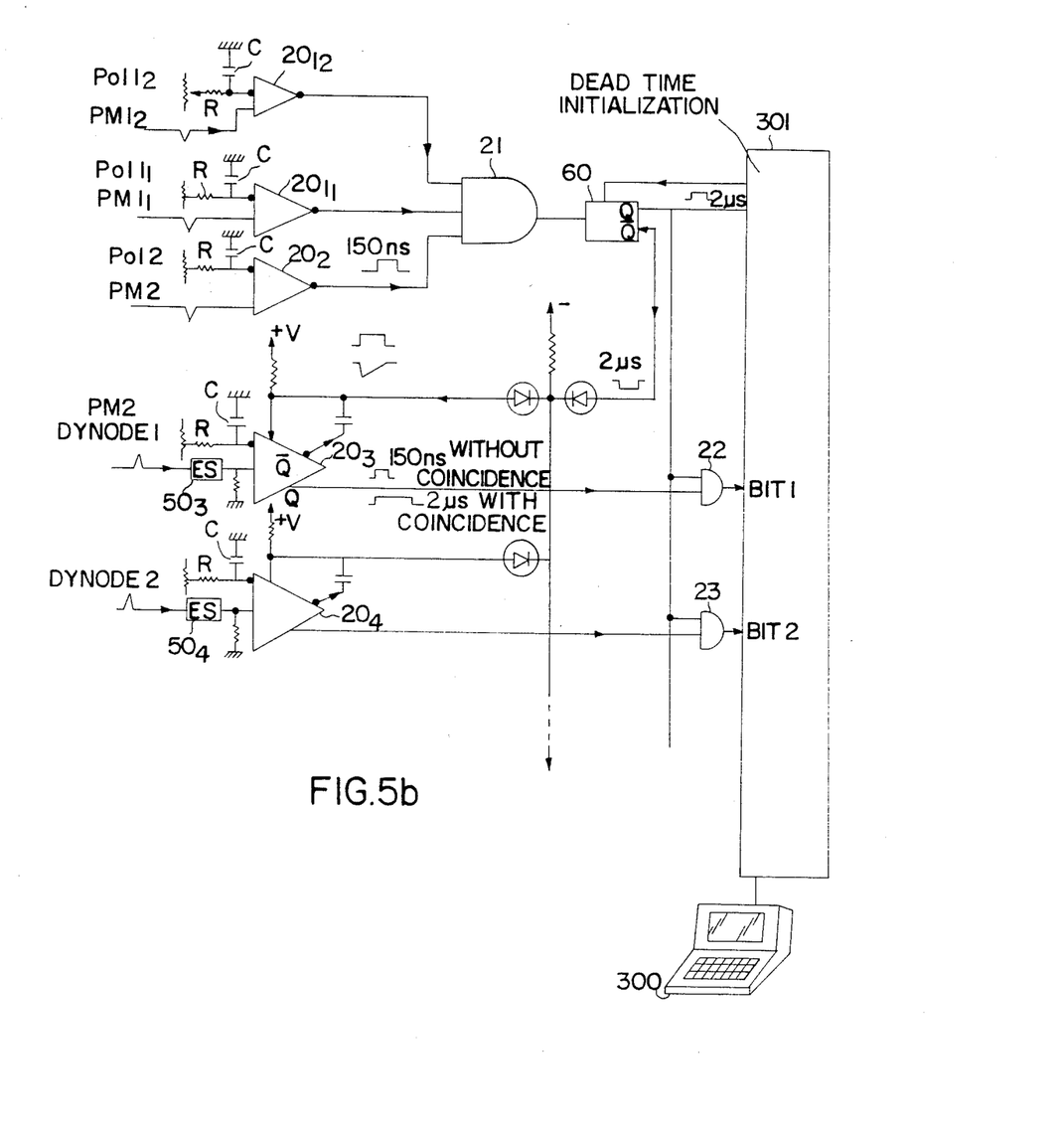
FIG. 5b shows a detailed schematic of threshold comparator means receiving an amplified signal delivered by the multidynode photomultipliers after amplification.

Referring to the aforementioned FIG. 5b, the threshold comparator means may comprise a plurality of elementary threshold comparators or circuits $20_{11}$ through $20_k$, one of the elementary comparator circuits $20_{11}$, $20_{12}$, $20_2$ receiving the respective signal delivered by the anode of the first multidynode photomultiplier P11 or the second multidynode photomultiplier P12 or the third multidynode photomultiplier P2 respectively associated with the first elementary group N11 or the second elementary group N12 or the second group N2. The other elementary comparator circuits $20_k$ receive on a first input the signal delivered by a dynode of the first photomultiplier P11, the second photomultiplier P12 or the third photomultiplier P2. An AND circuit 21 receives the signals delivered by the threshold comparators $20_{11}$, $20_{12}$ and $20_2$. The output of the AND circuit is fed to a monostable 60. An output of this monostable 60 is connected to a controlling microcomputer 300.

In the embodiment shown in FIG. 5b one output of the monostable 60 is fed to the blocking input of the threshold circuits $20_3$ through $20_k$. Under these conditions the threshold circuit is blocked in the state applying at the time of arrival of the pulse from the monostable 60 and remains in this state throughout the duration of the pulse. This technique therefore makes it possible to obtain at the output of the threshold comparators $20_3$ through $20_k$ output pulses with a duration of approximately 2 μs when a signal is present at a dynode at the same time as a coincidence signal is delivered by the monostable 60. These extended output signals are then applied to one input of AND circuits 22 through 2k. To the other input is applied the output signal of the monostable 60. The resulting coincidence signal which has a width of approximately 2 μs can then be sent direct to a parallel input-output board 301 in the microcomputer 300.

As the pulse from the monostable 60 is slightly delayed relative to the dynode pulses it is necessary to ensure that in the presence of a dynode signal the threshold comparator remains at a high level until the pulse from the monostable 60 arrives. To this end the output signal of the threshold comparator $20_3$ through $20_k$ is fed to the blocking input of the comparator through a resistor-capacitor network RC. This makes it possible to hold the comparator at a high level for approximately 150 μs, which allows time for the pulse from the monostable 60 to arrive.

The high resolution autofluoroscope in accordance with the invention offers particularly high performance because of the numerous advantages it has relative to prior art autofluoroscopes.

In particular, the autofluoroscope in accordance with the invention is very easy to use, notably because multidynode photomultipliers are employed.

Also, the subsequent analysis of the signal is very simple since coding of the fibers is a spatial type coding and therefore does not require any analysis of the signal waveform, as would be the case with detection by a charge transfer device.

Also, in the embodiment described virtually total elimination of background noise is achieved by multiple coincidence (two coincidences in the direction D1 and two coincidences in the direction D2) by virtue of the subdivision of the arrays of fibers of groups N1 and N2 into corresponding elementary groups N11, N12, N21, N22 and Fj,r.

Finally, one of the most important advantages of the autofluoroscope in accordance with the invention resides above all else in the ability to count at very high rates, between $10^6$ and $10^7$ impacts per second, which significantly increases the potential application area for this type of detector and its corresponding uses. This figure has to be compared with the $10^2$ to $10^3$ impacts per second feasible with the prior art devices.

Furthermore, because of the separation of the elementary groups N11, N12 and N21, N22 by a distance HP, the separation power of the autofluoroscope in accordance with the invention is significantly improved.

We claim:

1. Very high resolution autofluoroscope for ionizing radiation comprising at least one array made up of a set of filament-like members adapted to enable spatial marking of a surface to be analyzed according to a specific frame of reference and adapted to detect said radiation by scintillation and to transmit light produced by such detection, wherein said array is formed by two groups of optical fibers, each fiber is disposed along a respective straight line segment defining two orthogonal directions delimiting an analysis plane or surface, and at least one of said groups is subdivided into two elementary groups which are spaced in a direction perpendicular to said analysis plane or surface and the fibers of which are parallel.

2. Autofluoroscope according to claim 1 wherein one of said groups is subdivided into two elementary groups the optical fibers of which are on the same side of the other group of optical fibers.

3. Autofluoroscope according to claim 1 wherein one of said groups is subdivided into two elementary groups the optical fibers of which are on opposite sides of the other group of optical fibers.

4. Autofluoroscope according to claim 1 wherein both said groups are subdivided into elementary groups the optical fibers of which are interleaved by virtue of said elementary groups being interleaved.

5. Autofluoroscope according to claim 1 wherein all said optical fibers have the same diameter.

6. Autofluoroscope according to claim 1 wherein said optical fibers have different diameters and the optical fibers having the smallest diameter constitute an elementary group adapted to form said analysis surface.

7. Autofluoroscope according to claim 6 wherein the optical fibers of said two groups have diameters in the ratio $\frac{1}{2}$.

8. Autofluoroscope according to claim 1 wherein said optical fibers are grouped at one end to form subsets and said subsets constituting the first and second elementary groups constituting the first group, constituting the second group and constituting the first and second elementary groups constituting the second group are coupled to first and second pluralities of detector means.

9. Autofluoroscope according to claim 8 wherein each of said, first and second pluralities of detector means comprise two or one multidynode photomultiplier(s), according to whether said groups are subdivided, each photocathode of each multidynode photomultiplier being coupled to one of said subsets.

10. Autofluoroscope according to claim 9 wherein said multidynode photomultipliers are self-synchronized.

11. Autofluoroscope according to claim 9 further comprising means for detecting coincidences in the signal delivered by the detector means of the same level and transcoding means for establishing the rank of the corresponding optical fiber on the basis of coincident detection by two detector means.

12. Autofluoroscope according to claim 11 wherein said means for detecting coincidences means comprise, coupled to each detector means amplifier means delivering an amplified signal, threshold comparator means receiving said amplified signal and delivering a logic signal in the presence of an amplified signal above the threshold value, and logic comparator means operating on the state of the logic signal delivered by said threshold comparator means.

13. Autofluoroscope according to claim 12 wherein the rank of the fiber affected by detection by scintillation is given by the logic equation:

$$i = (Fj,r,i) \cap (Fj+p,r,i)$$

in which F(f,r,i) and F(j+p,r,i) represent the subsets of rank j and j+p of the same group or elementary group of the same level r for which the logic signal delivered by the corresponding detector means of the same level r and of rank k=j and k'=j+p has the value 1.

14. Autofluoroscope according to claim 12 further comprising a microcomputer and a coincidence monostable and wherein said threshold comparator means comprise a plurality of elementary threshold comparator circuits, one of said elementary comparator circuits receiving the signal delivered by the anode of the first or second or third multidynode photomultiplier, the other elementary comparator circuits receiving on a first input the signal delivered by a dynode of the first photomultiplier, second photomultiplier or third photomultiplier and on a blocking second input a negative pulse signal delivered by said coincidence monostable, and a plurality of AND circuits, one of said AND circuits receiving on a first input the signal delivered by said threshold comparator circuit and on another input the signal delivered by said threshold comparator circuit through the intermediary of a delay line, the other AND circuits receiving on a first input the signal delivered by said one of said AND circuits and on a second input the signal delivered by said threshold comparator circuits, the outputs of said other AND circuits and of said monostable being connected to said microcomputer.

15. Autofluoroscope according to claim 14 wherein said transcoding means comprise a processing program memorized in said microcomputer, said program for determining the rank of the fibers affected by scintillation detection making it possible to solve for each group or elementary group the logic equation:

$$i = (F_{j,r,i}) \cdot (F_{j+p,r,i})$$

in which $F(j,r,i)$ and $F(j+p,r,i)$ represent the subsets of rank $j$ and $j+p$ of the same group or elementary group of the same level $r$ for which the logic signal delivered by the corresponding detector means of the same level $r$ and of rank $k=j$ and $k'=j+p$ has the value 1.

* * * * *

UNITED STATES PATENT AND TRADEMARK OFFICE
CERTIFICATE OF CORRECTION

PATENT NO. : 4,973,845
DATED : 11/27/90
INVENTOR(S) : Mastrippolito et al.

It is certified that error appears in the above-identified patent and that said Letters Patent is hereby corrected as shown below:

| | | |
|---|---|---|
| col. 01, line 09 | delete "a very high" | after the word "high" |
| col. 04, line 35 | delete "Fi2" | insert "fi2" |
| col. 04, line 35 | delete "of group 2" | after "Fi2" |
| col. 12, line 18 | delete "," | |
| col. 12, line 33 | delete "means" | after the word "coincidences" |
| col. 12, line 47 | delete "F(f,r,i)" | insert --F(j,r,i)-- |
| col. 14, line 04 | delete "i=(Fj,r,i)•(Fj + p,r,i)" | insert --i=(Fj,r,i)∧(Fj + p,r,i)-- |

Signed and Sealed this

Second Day of November, 1993

Attest:

BRUCE LEHMAN

Attesting Officer — Commissioner of Patents and Trademarks